(12) United States Patent
Volatier

(10) Patent No.: US 8,640,608 B2
(45) Date of Patent: Feb. 4, 2014

(54) TOASTER WITH PIVOTING LATERAL DOOR

(75) Inventor: Sébastien Volatier, Dijon (FR)

(73) Assignee: SEB S.A., Ecully (FR)

( * ) Notice: Subject to any disclaimer, the term of this patent is extended or adjusted under 35 U.S.C. 154(b) by 519 days.

(21) Appl. No.: 12/884,647

(22) Filed: Sep. 17, 2010

(65) Prior Publication Data

US 2011/0067578 A1  Mar. 24, 2011

(30) Foreign Application Priority Data

Sep. 18, 2009 (FR) ...................... 09 04472

(51) Int. Cl.
*A47J 37/08* (2006.01)
*A21B 3/13* (2006.01)
*H05B 3/00* (2006.01)
*H05B 3/06* (2006.01)

(52) U.S. Cl.
USPC ............ 99/385; 219/200; 219/521; 99/324

(58) Field of Classification Search
USPC ........... 99/339, 340, 385, 389–393; 219/385, 219/386, 402–408, 520, 521
See application file for complete search history.

(56) References Cited

U.S. PATENT DOCUMENTS

| 1,697,914 | A | 1/1929 | Hummel et al. |
| 2,491,529 | A | 12/1949 | Spreen |
| 2007/0151463 | A1 * | 7/2007 | Starr et al. ..................... 99/389 |
| 2009/0071347 | A1 | 3/2009 | Lee |
| 2009/0139409 | A1 * | 6/2009 | Hall et al. ..................... 99/326 |

FOREIGN PATENT DOCUMENTS

| GB | 771015 A | 3/1957 |
| WO | WO03056989 A1 | 7/2003 |

* cited by examiner

*Primary Examiner* — Tu B Hoang
*Assistant Examiner* — Joseph Iskra
(74) *Attorney, Agent, or Firm* — Browdy and Neimark, PLLC

(57) ABSTRACT

A toaster with an housing containing at least one toasting chamber accessible from the top, the housing having a side wall that includes a door mounted to pivot about a horizontal axis relative to the rest of the housing, the axis being in a lower part of the housing, the toaster further including at least one bread carriage spaced from the axis so that in the open position of the door, a portion of bread on the carriage projects out of the housing.

10 Claims, 2 Drawing Sheets

TOASTER WITH PIVOTING LATERAL DOOR

BACKGROUND OF THE INVENTION

The present invention relates to a toaster, in particular of the type having a lateral door for the loading and unloading of bread.

Traditional toasters typically include a housing containing at least one toasting chamber for toasting bread. Introduction of bread into the toaster is accomplished via openings, or slots, at the top of the housing. A bread supporting carriage is then actuated to lower the bread into the toasting chamber. At the end of the toasting cycle, a return spring lifts the bread supporting carriage, and thus the bread. However, this lifting may be insufficient for some bread shapes or sizes that offer gripping areas that are too small for grasping without the risk of burnt fingers.

U.S. Pat. No. 2,562,535 describes a toaster allowing loading and unloading of bread via the side of the toaster. The toasting chamber has openings via which bread is introduced. Given the particular semicircular form of the toaster, the openings are curved in a vertical plane. The bread supporting carriage is mounted to pivot relative to the body of the toaster. In the toasting position, the carriage pivot point is located at the top and right of the bottom of the carriage. A disadvantage of this solution is that the carriage handle is very close to the heating elements, which poses a risk to the user.

The toaster disclosed in U.S. Pat. Pub 2009/0071347 resembles a mini-oven. Indeed, the toaster has a side door that can pivot. The housing of the toaster does not have any other opening. For toasting, bread is placed on the door in a centering system for the bread formed by a rigid metal wire structure. A contactor allows the start of bread toasting after closing the door. Bread is not visible during the toasting operation. Access to the bread after toasting requires complete opening of the door, which increase the space that must be available for the toaster.

BRIEF SUMMARY OF THE INVENTION

The present invention provides a novel toaster that is constructed to provide easy access to the bread after toasting, without significantly modifying the general architecture of the toaster.

This is achieved, essentially, by a toaster with a housing containing at least one toasting chamber that is accessible through an opening provided at the top of the housing, wherein a lateral, or side, wall of the housing includes a door that is mounted to pivot relative to the side wall about a substantially horizontal axis, located in a lower area of the housing, between a closed position and an open position, the door having at least one bread support, or carriage, the axis of rotation of the door being horizontal and positioned in the lower part of the housing and being remote, or spaced, from the bread carriage(s) in such a manner that in the open position of the door, at least part of the bread on the bread carriage projects out of the housing.

Thus, the toaster architecture is not drastically changed since loading of bread may continue to take place through the openings, or slots, located on the upper part of the housing.

The fact that the bread carriage is mounted to the pivoting door assures safe use of the toaster with respect to the heat generated by the heating elements.

In addition, by offsetting the axis of rotation of the bread carriage, a large portion of a piece of bread or toast becomes accessible after the door is opened.

According to a particular embodiment, the bread carriage(s) are fixed on the pivotable door so that in the open position at least 60% of the surface of a slice of bread is located outside of the housing.

Thus, by offsetting the pivot axis of the door, opening of the door allows a large part of the slice of bread, of toast, to be accessible.

In other variants of embodiments of the invention:
the toaster includes a control panel mounted on the housing, beneath the door;
the, or each, bread carriage includes two posts, or uprights, a first post being fixed to the inside of the door surface and the second post being supportive of the first, the first and second posts forming a V, the angle between the first and second posts and the angle between the first post and the inner surface of the door being determined so that in the open position of the door, the first post is substantially horizontal and in the closed position of the door, the second post is substantially horizontal;
the longitudinal edges of the first post of the bread carriage comprise side walls that form a guide to retain the bread when the door is open;
the, or each, toasting chamber includes means for centering a slice of bread, comprising a pair of grids, or grates, actuated by a movement of the bread carriage;
each toasting chamber comprises heating elements and the toaster comprises means for disconnecting the heating elements in response to opening of the door; and
the door has a gripping handle in its upper part, remote from the introduction openings of the toasting chamber(s).

BRIEF DESCRIPTION OF THE DRAWINGS

Other particularities and advantages of the present invention will appear from the following description of a particular embodiment given by way of non-limiting example, and illustrated by the accompanying drawings, in which.

DETAILED DESCRIPTION OF THE INVENTION

Figure 1A:
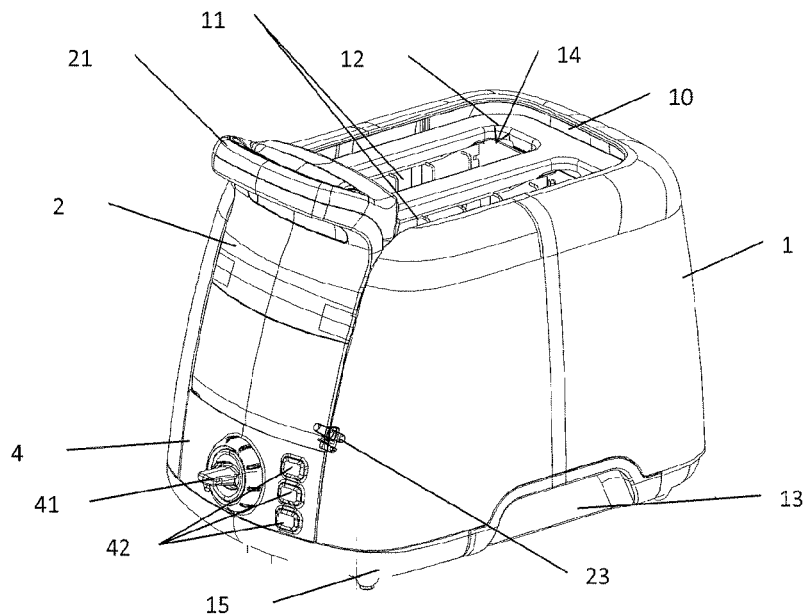
FIG. 1A is a perspective, front view of a preferred embodiment of a toaster according to the present invention in the closed position.
Figure 1B:
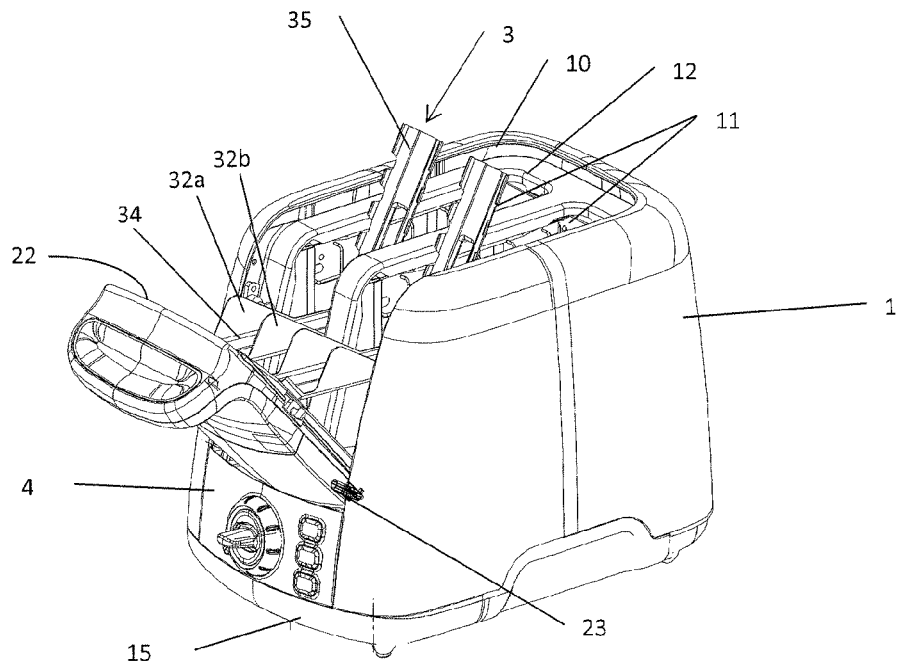
FIG. 1B is a perspective, front view of the toaster of FIG. 1A in the open position.

The illustrated embodiment of a toaster in accordance with the present invention includes a housing 1 that contains, in a conventional manner, a toasting chamber 14 delimited by a bottom wall, two longitudinal side walls, two transverse side walls and a top wall that has openings 12 for the paasage of bread slices into and out of the toasting chamber. Toasting chamber 14 may include several compartments 11 allowing simultaneous toasting of several slices of bread. Compartments 11 are provided with heating elements for the toasting of bread. Conventional heating elements, such as quartz rods or resistive heating wires, may be used. Each compartment 11 has an opening 12 at the top of housing 1. These openings are used to introduce bread into the toaster. Housing 1 also includes a base, or pedestal, 15 that enables the toaster to rest on a substantially flat surface. Also, base 15 may include a removable drawer 13 to collect bread crumbs.

According to the invention, housing 1 includes a side door 2 mounted to pivot around a horizontal axis 23. Door 2 is mounted on a surface of housing 1. Thus, door 2, and in particular inner wall 22 of door 2, forms one of the walls of toasting chamber 14. Pivot axis 23 of door 2 is positioned in the lower part housing 1. Also, axis 23 is located at the bottom edge of door 2. According to the embodiment shown, axis 23 is positioned in the lower one-third of housing 1. When door 2 is closed, the outer surface of the door forms one transverse side wall, or part of one transverse side wall, of housing 1. Thus, the overall form of housing 1 is very similar to that of a conventional toaster.

Door 2 also has a gripping handle 21. Handle 21, for example in the form of a horizontal arch, is located at the top of door 2 and on its outer face. Other forms of handles are also possible: button, vertical arch, etc. According to a variant not represented, handle 21 can be positioned slightly below the upper edge of door 2, so that this upper edge forms a screen that protects users from the heat emitted when the toaster if the user should grip the handle while the toaster is in use. The upper edge of door 2 can also extend above the top of housing 1 to increase the thermal screen effect. Also, an abutment may be provided in housing 1 to avoid excessive rotation of door 2 during opening. One can also provide another handle or protuberance on one or two side walls, preferably the transverse side walls, to keep the toaster stable when the door is being opened.

Inner wall 22 of door 2 carries bread carriage 3. When the toaster has several compartments, a respective carriage 3 is provided for each compartment. The, or each, carriage 3 is fixed to door 2 so that the carriage also pivots with the door relative to housing 1. Attachment of carriage(s) 3 to door 2 is chosen to make the axis of rotation of door 2 remote from carriage(s) 3. Thus, the amplitude of movement of carriage(s) 3 is increased, allowing, during opening of door 2, exposure of a larger surface of bread.

The, or each, carriage 3 includes a first post 34 having a first end that is attached to the inner surface of door 2. The second end of first post 34 is fixed to a second post 35 in such an position that posts 34 and 35 form a V. Each post 34, 35 is generally formed as a band having side walls, or flanges, or lips, or rims over at least a portion of its length. According to the embodiment illustrated in the figures, the edges of first post 34 are made up of side walls 32a, 32b perpendicular to a longitudinal center band that carries walls 32a, 32b. Side walls 32a, 32b form a guide or support for bread placed on carriage 3. These side walls 32a, 32b also help prevent the bread from tipping over when door 2 is opened. Second post 35 may have recesses or openings intended to allow crumbs to drop onto removable drawer 13 located at the bottom of the toaster.

First post 34 forms an angle β with inner wall 22 of door 2, the angle being selected so that in the open position of door 2, first post 34 will be substantially horizontal. For example, the angle β is between 30° and 45°. Similarly, the angle α—formed between posts 34, 35 is chosen to cause the second post to have a substantially horizontal orientation when door 2 is in the closed position. For example, angle α between the first and the second posts is between 100° and 120°. Depending on the angle values selected, at least 60% of the surface of a slice of bread will come to be outside of housing 1 when door 2 is opened.

Door 2 can be constructed as a thermal insulator to avoid becoming hot overly due to heating of carriage(s) 3.

Each toasting chamber 11 also includes bread centering means 36 that include, for each toasting chamber 11, a pair of grids 36 vertically mounted in the toasting chamber. Each grid 36 consists of an assembly of metal rods. These grids 36 are articulated to, on the one hand, leave enough space for passage of carriage 3 and, on the other hand, hold the bread in position when it is introduced into the toaster. Movement of grids 36 toward the bread is, for example, assured by a pivot link (not represented) on which the pair of grids 36 is mounted.

The centering means, including a pivot link, could, for example, have the form disclosed in U.S. Pat. Pub 2009/0071347, cited earlier herein.

The pivot link is located in the lower part of housing 1, for example under carriage 3, in order to make space available in the toasting chamber. The pivot link is actuated directly or indirectly by movement of carriage 3. Thus, when second post 35 of carriage 3 reaches the bottom of the toasting chamber, grids 36 undergo a movement toward one another.

Housing 1 is also provided with a control panel 4 having conventional electronic control elements (not shown) and several control buttons 41, 42 allowing the user to turn the toaster on and off and to choose the level, or degree, of toasting. For example, toasting level selection button 41 is of the rotary wheel type. Control panel 4 is, for example, located under door 2.

The electronic controls provide for turning the heating elements on and off as needed. The electronic controls also include a device for disconnecting the heating elements from electrical power upon opening of door 2.

Figure 2:
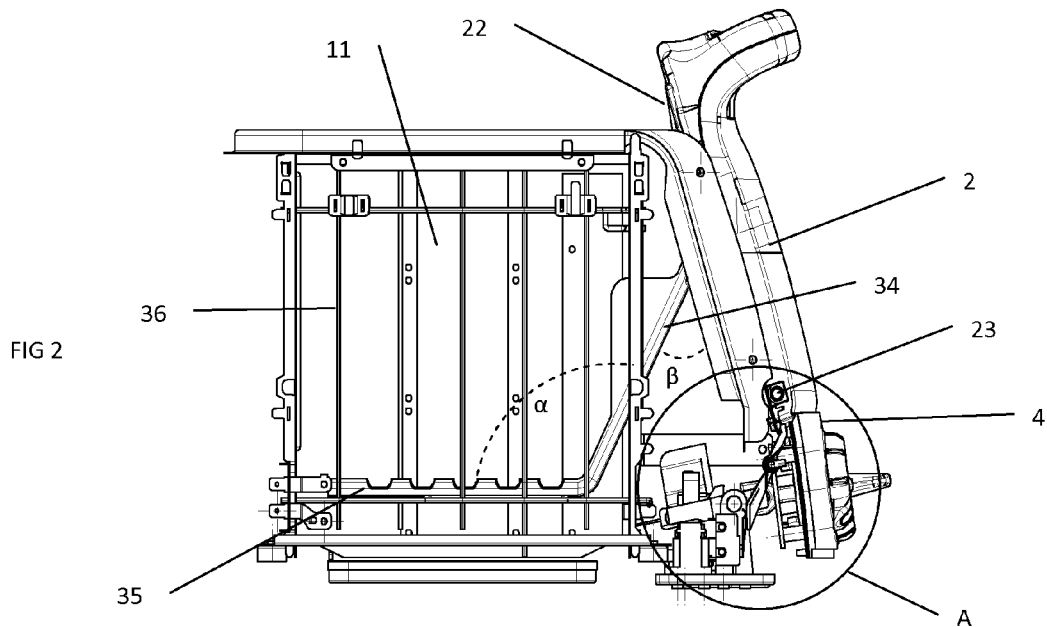
FIG. 2 is a side detail view of a portion of the toaster of FIGS. 1A and B, with part of the housing removed to allow viewing of internal parts.
Figure 3:
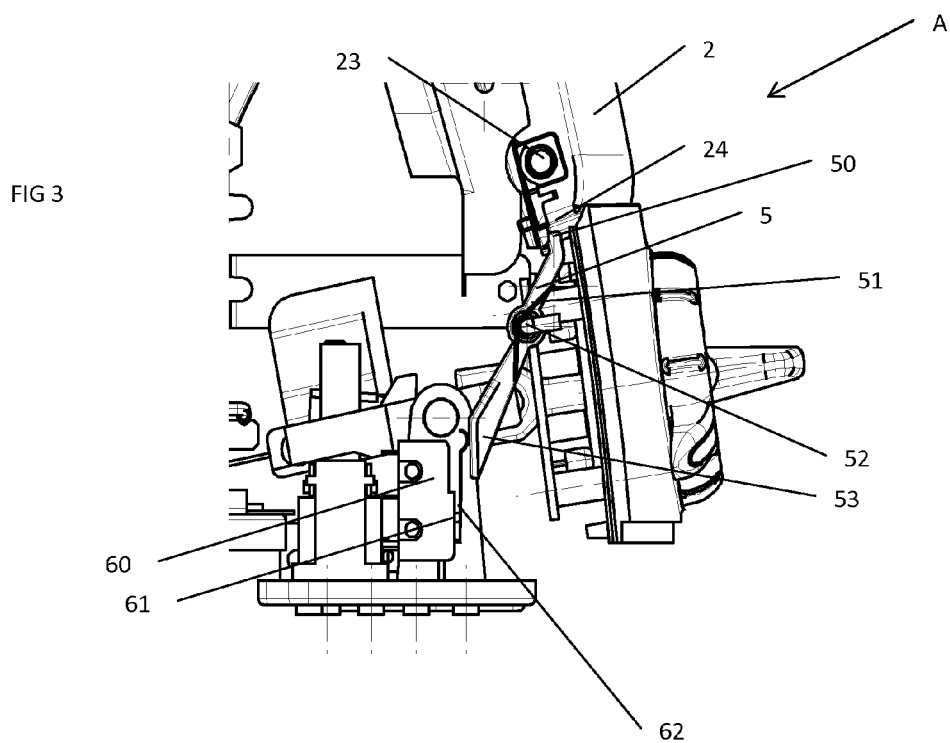
FIG. 3 is a side detail view of a portion of the toaster shown in circle A of FIG. 2, showing the mechanism for disconnecting power from the heating elements.

One possible disconnecting device is shown in FIG. 3, which shows a detail of FIG. 2. This device includes a microswitch 60 that includes a fixed microcontact 61 and a flexible blade 62 that is pivotably mounted and movable relative to microcontact 61. Switch 60 is mounted on the power supply circuit of the heating means. Pressure of flexible blade 62 on microcontact 61 closes the electrical circuit for supplying heating power to the heating means. The disconnecting device also includes a lever 5 pivotally mounted on an axis 52 that is fixed relative to housing 1. When door 2 is in the closed position, a first end 50 of lever 5 is engaged in a notch 24 formed at the lower edge of door 2 and providing a surface against which first end 50 of spring 5 bears. The second end 53 of lever 5 pushes flexible blade 62 of microswitch 60 against microcontact 61. A spring 51, here a torsion spring, is associated with lever 5 to produce a force that urges lever 5 to pivot in a counterclockwise direction, with respect to the view of FIG. 3.

The disconnecting device operates as follows. As described above, when door 2 is closed, second end 53 of lever 5 pushes firmly and flexibly against microcontact blade 62 to cause it to press against microcontact 61 so that microswitch 60 remains closed. When door 2 opens, first end 50 of lever 5 is no longer restrained by notch 24. The force produced by spring 51 then causes 5 lever to rotate counterclockwise. Second end 53 no longer pushes on flexible blade 62, allowing microswitch 60 to open and disconnect power from the heating elements. The device thus reduces the risk of burns if the door should be opened during a toasting procedure.

The disconnecting device can also be a push button placed behind door 2 (not shown). The button would be triggered by closing door 2 so as to connect operating power to the heating means. Upon opening, the push button is released to disconnect the heating means from the power supply. Other power cut-off devices may also be used without leaving the framework of the invention.

The operation of the toaster according the invention is as follows. The user can introduce bread into compartments 11 either through openings 12 if door 2 is closed, or by depositing the slice(s) of bread on first post 34 of carriage 3 when door 2 is open, followed, in the latter case, by closing door 2. The closing movement of door 2 causes the bread to tip, or rock, over onto second post 35 of carriage 3. The user selects the degree of toasting by acting on rotary button 41 and initiates a toasting cycle by pressing on button 42. This action causes the electric heating power to be supplied to the heating means. At the end of a toasting cycle, or during the cycle, the user can open door 2 to safely retrieve the bread.

Due to the architecture of door 2, removal of bread can take place at a point far from toasting chamber 11, which decreases the risk of burns. The slice of bread is also more easily accessible at the end of a toasting cycle without the general architecture of the toaster being significantly altered compared with the architecture of a conventional toaster.

This application relates to subject matter disclosed in French Application Number 09 04472, filed Sep. 18, 2010, the disclosure of which is incorporated herein by reference.

The foregoing description of the specific embodiments will so fully reveal the general nature of the invention that others can, by applying current knowledge, readily modify and/or adapt for various applications such specific embodiments without undue experimentation and without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. The means, materials, and steps for carrying out various disclosed functions may take a variety of alternative forms without departing from the invention.

Thus the expressions "means to . . . " and "means for . . . ", or any method step language, as may be found in the specification above and/or in the claims below, followed by a functional statement, are intended to define and cover whatever structural, physical, chemical or electrical element or structure, or whatever method step, which may now or in the future exist which carries out the recited function, whether or not precisely equivalent to the embodiment or embodiments disclosed in the specification above, i.e., other means or steps for carrying out the same functions can be used; and it is intended that such expressions be given their broadest interpretation.

What is claimed is:

1. A toaster comprising:
   a housing having a plurality of side walls enclosing at least one toasting chamber having an opening at the top for introduction of bread into said toasting chamber;
   a door mounted in an opening provided in one of said side walls for pivotal movement relative to said housing about a substantially horizontal axis, located in a lower area of said housing, between a closed position and an open position; and
   at least one bread carriage for supporting a slice of bread in said toaster, said carriage being spaced from said horizontal axis, said carriage being fixed to said door and movable with said door such that when said door is in the open position, at least part of a slice of bread carried on said carriage projects out of said housing,
   each said at least one bread carriage comprises at least a first post and a second post, said first post being fixed to an inner surface of said door and said second post being fixed to said first post so that said first and second posts form a V that delimits an angle $\alpha$, said first post forms an angle $\beta$ that has a non-zero value with the inner surface of said door, and $\alpha$ and $\beta$ have values such that said first post is substantially horizontal when said door is in the open position and said second post is substantially horizontal when said door is in the closed position, such that a portion of each said at least one bread carriage extends through said opening at the top when said door is in the open position.

2. The toaster according to claim 1, wherein when said door is in the open position, at least 60% of the surface of a slice of bread on said carriage is outside of said housing.

3. The toaster according to claim 2, further comprising a control panel disposed below said door and forming part of said housing.

4. The toaster according claim 1, wherein said first post has longitudinal edges provided with side walls forming a support for a slice of bread when said door is in the open position.

5. The toaster according to claim 1, wherein said at least one toasting chamber comprises centering means including a pair of wire grids for centering a slice of bread in said at least one toasting chamber, said centering means being movable in response to movement of said bread carriage.

6. The toaster according to claim 1, said at least one toasting chamber comprises heating elements, and said toaster further comprises means for preventing heating power from being supplied to said heating elements when said door is moved to the open position.

7. The toaster according to claim 1, wherein said door has a gripping handle located at an upper part of said door, spaced from said opening at the top of said housing.

8. The toaster according to claim 1, wherein said first post has a first end that is fixed to said door and a second end that is remote from said first end and is spaced from said door, and said second post is fixed to said second end of said first post that is spaced from said door.

9. The toaster according to claim 8, wherein said first post is positioned to provide a bread support when said door is in said open position and said second post is positioned to provide a bread support when said door is in said closed position.

10. The toaster according to claim 1, wherein said first post is positioned to provide a bread support when said door is in said open position and said second post is positioned to provide a bread support when said door is in said closed position.

\* \* \* \* \*